United States Patent
Demaj et al.

(10) Patent No.: US 9,264,098 B2
(45) Date of Patent: Feb. 16, 2016

(54) PROCESS FOR FINGER INSERTION AND REMOVAL IN A RAKE RECEIVER AND RECEIVER FOR CARRYING OUT THE PROCESS

(75) Inventors: Pierre Demaj, Nice (FR); Fabrizio Tomatis, Saint Laurent du Var (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 383 days.

(21) Appl. No.: 13/256,403

(22) PCT Filed: Mar. 11, 2010

(86) PCT No.: PCT/EP2010/001531
§ 371 (c)(1),
(2), (4) Date: Sep. 13, 2011

(87) PCT Pub. No.: WO2010/102818
PCT Pub. Date: Sep. 16, 2010

(65) Prior Publication Data
US 2012/0002769 A1   Jan. 5, 2012

(30) Foreign Application Priority Data
Mar. 13, 2009  (FR) ...................................... 09 01172

(51) Int. Cl.
*H04L 27/06*  (2006.01)
*H04B 1/7117*  (2011.01)
*H04B 1/69*  (2011.01)
*H04B 17/00*  (2015.01)

(52) U.S. Cl.
CPC ............... *H04B 1/7117* (2013.01); *H04B 1/69* (2013.01); *H04B 17/0045* (2013.01); *H04B 2201/70701* (2013.01)

(58) Field of Classification Search
CPC ................. H04B 17/0045; H04B 2201/70701; H04B 1/7117; H04B 1/69
USPC .................. 375/260, 267, 347, 130, 147, 148
See application file for complete search history.

(56) References Cited

U.S. PATENT DOCUMENTS

| | | | | |
|---|---|---|---|---|
| 5,926,503 A * | 7/1999 | Kelton et al. | | 375/148 |
| 6,680,967 B1 * | 1/2004 | Westman | | 375/148 |
| 6,813,309 B1 * | 11/2004 | Ogino | | 375/148 |
| 7,340,017 B1 * | 3/2008 | Banerjee | | 375/348 |
| 8,041,325 B2 * | 10/2011 | Jonsson et al. | | 455/296 |
| 2001/0034254 A1 * | 10/2001 | Ranta | | 455/574 |

(Continued)

FOREIGN PATENT DOCUMENTS

| | | |
|---|---|---|
| EP | 1478098 A2 | 11/2004 |
| EP | 1553707 A1 | 7/2005 |

(Continued)

*Primary Examiner* — Shuwang Liu
*Assistant Examiner* — Ross Varndell
(74) *Attorney, Agent, or Firm* — Coats & Bennett, PLLC

(57) ABSTRACT

Process of assignment and deallocation of a correlation unit or finger of a rake receiver intended to treat a received signal of a wireless communication system characterized in that the assignment of a finger is ordered by a CPICH detector operating on the level of the frame of said signal and in that the deallocation of the same finger is controlled by the analysis of a criterion derived from the RSCP indicator calculated on the level of a slot of said signal.

The invention also achieves a rake receiver for the implementation of the process.

8 Claims, 3 Drawing Sheets

(56) References Cited

U.S. PATENT DOCUMENTS

2005/0190735 A1* 9/2005 Shinoda .................. 370/342
2010/0135361 A1* 6/2010 Tomatis et al. ............. 375/144

FOREIGN PATENT DOCUMENTS

| WO | 2005011157 A1 | 2/2005 |
| WO | 2008107848 A1 | 9/2008 |

* cited by examiner

PROCESS FOR FINGER INSERTION AND REMOVAL IN A RAKE RECEIVER AND RECEIVER FOR CARRYING OUT THE PROCESS

PRIORITY CLAIM

The present application claims priority to PCT/EP2010/001531 titled "Process for Finger Insertion and Removal in a Rake Receiver and Receiver for Carrying Out The Process," filed with the European Patent Office on 11 Mar. 2010, which claims priority to FR 0901172 filed with the French Patent Office on 13 Mar. 2009, the disclosure of which is incorporated herein by reference in its entirety.

TECHNICAL FIELD

The present invention relates to the field of wireless digital communications and in particular a process for finger insertion and removal in a rake receiver for a 3G wireless communication system.

BACKGROUND ART

In the field of wireless digital communications, several techniques are known for ensuring the division of a given frequency spectrum between several users, such as the TDMA (or Time division multiple access) technique, FDMA (frequency division multiple access) and CDMA (code division multiple access), the latter being based on the use of the Walch-Hadamard orthogonal codes.

The CDMA technique is used in 3rd generation telephony, in particular with the development of UTMS (Universal Mobile Systems Telecommunication) standard, as defined by the 3GPP (3rd Generation Partnership Project) organism of standardization.

As it is known, in wireless communication, a signal is often the object of dispersions, reflections, fading etc. . . . , causing the reception, within the receiver, of a multiplicity of shifted signals one against the others, characteristics of many paths.

One treats these reflections, multiple dispersions of a signal by means of a rake receiver, which comprises a multiplicity of units (fingers) for the treatment of the various reflections, shifted one against the others, in order to allow, after treatment, the summation of all the elementary contributions of the reflections resulting from multiple paths.

FIG. 1 illustrates the situation of a user equipment 2 comprising a rake receiver 3 likely to treat a number N of distinct reflection paths from a same signal emitted by a basic station 1. As a matter of clarity, only three paths, respectively 11-13, are represented in the figure and correspond to three distinct contributions of a same signal arriving to the receiver at shifted moments, and with different amplitudes.

Generally, the assignment of the fingers of a rake receiver is carried out by means of a pilot detection mechanism ("Common Pilot Channel" (CPICH)) and by its possible reflections. For this purpose, one achieves a measurement of the energy of the received signal and a comparison with a threshold value, as that illustrated in FIG. 2, in order to detect the different reflection paths. FIG. 2 shows that, following a first significant path of high amplitude corresponding to direct signal reception (Line of Sight), two reflection paths of lesser energy follow. The mechanism of threshold detection is regulated in a manner to avoid the false detections (Constant False Alarms Rate (CFAR)) but can cause an omission of one or more paths presenting a lesser energy, as the case of the 2nd reflection in FIG. 2.

In order to ensure a maximum effectiveness at the receiver, it is important that the process of assignment and deallocation of the correlation units (Finger) of the rake receiver is particularly reactive. Indeed, because of the receiver mobility but also because of the changing characteristics of the communication channel, the propagation paths offer multiple reflections that change quickly and it is essential that the rake receiver can follow these changes rapidly and precisely.

Obviously, this precision and this reactivity in the process of assignment and deallocation of the correlators (Finger) of the rake receiver initially determine the level of BLER (Block Error Rate).

In a second level, the reactivity of the receiver determines the effectiveness of the process known as HANDOFF, allowing one mobile equipment, in communication, to switch from a first to a second base station. Indeed, one recalls that in the UMTS context, the receivers must permanently follow the reception of data emanating from several base stations in order to allow, in a cell limit, the switching (handoff) from one station to another one without disconnection of the communication. For this reason, it is essential that a rake receiver is able to follow, precisely and rapidly, not only the propagation paths of its own base station, but also those emanating from the neighboring base stations.

It can thus be observed how critical is the problem of assignment of the resources of the rake receiver, and particularly that of each correlation unit which composes it.

One tries to avoid as much as possible the assignment of a correlator to a propagation path which would be proved, later on, not to correspond to a true reflection of the transmitted signal.

Conversely, an erroneous detection of a propagation path must be restored as soon as possible in order to deallocate the unduly affected correlator with the false path and to allow a new assignment.

Generally, in order to solve this critical problem, the assignment of a correlator (Finger) to a propagation path is based on one or more indicators, such as, for example, the power of the signal or the signal to noise ratio measured on the frame level.

In order to avoid false detections, likely to generate false assignments, it is necessary, in these known techniques, to carry out several consecutive measurements on this or these indicators and to integrate the result of these measurements on several frames.

This results, and that is a major disadvantage, to a high time constant in the assignment process and, finally, to a low reactivity of the receiver.

It is advisable to be able to gain from an effective and especially from a faster process in the assignment of the correlator of a rake receiver and the deallocation of the resources of this same receiver, deallocation necessary during a false detection or at the time of disappearance of a given propagation path.

SUMMARY OF THE INVENTION

The object of the present invention is to propose a new process of detection and assignment of the correlators of a rake receiver with different detected paths of detection which process is particularly simple to implement.

Another object of this invention consists in proposing a process and a new type of receiver offering a great reactivity to intervening changes during a data communication session.

It is another object of the present invention to provide a cellular telephone or a digital communication system for a $3^{rd}$ generation network offering a mechanism of assignment and deallocation of the correlators of a rake receiver being particularly swift.

The invention achieves these goals by means of a process of assignment and deallocation of a correlation unit or finger of a rake receiver in which the assignment of a finger is ordered by the CPICH detector for the detection of a propagation path in only one frame.

The process is characterized in that the finger deallocation is controlled by the analysis of a criterion derived from the RSCP indicator calculated on the level of a slot of said signal.

This mechanism is very simple to implement since the RSCP indicator is one indicator already available within the system.

Moreover, and that constitutes a considerable advantage, this indicator provides a filtered value, calculated on the level of a slot, which even permits to consider a process of averaging this indicator in order to refine the process of finger deallocation.

In one embodiment, the detection of a propagation path within said CPICH detector is based on the power detection on the CPICH channel.

In an embodiment, the finger deallocation of the rake receiver is effective from the analysis of the first value of the RSCP.

Alternatively, the deallocation is effective after an integration of n successive values of said RSCP within the same frame.

The invention also allows the production of a rake receiver for a wireless communication device of third generation including:
    means for assigning a correlation unit or finger from the detection, on only one frame, of a propagation path;
    means for deallocating the aforementioned correlation unit or finger controlled by the analysis of a criterion derived from the RSCP indicator calculated on the level of a slot of said signal.

The invention also allows the production of a User Equipment or of a cell phone for a wireless communication system of third generation.

The invention is particularly adapted to the realization of a cell phone or still a device of Portable Document Assistant (PDA).

DESCRIPTION OF THE DRAWINGS

Other characteristics, objects and advantages of the invention will appear by the reading of the description and the drawings hereafter, given only as non limitative examples. On the annexed drawings.

DESCRIPTION OF THE PREFERRED EMBODIMENT

Figure 1:
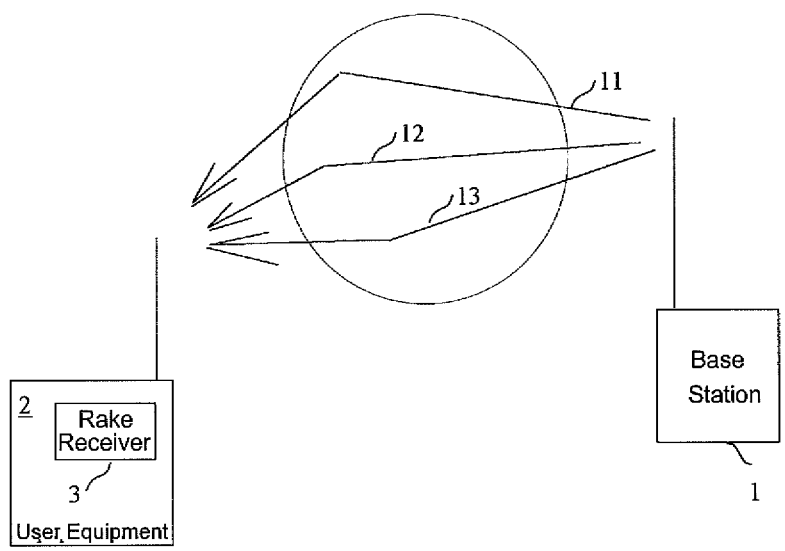
FIG. 1 illustrates the essential function of a RAKE receiver
Figure 2:
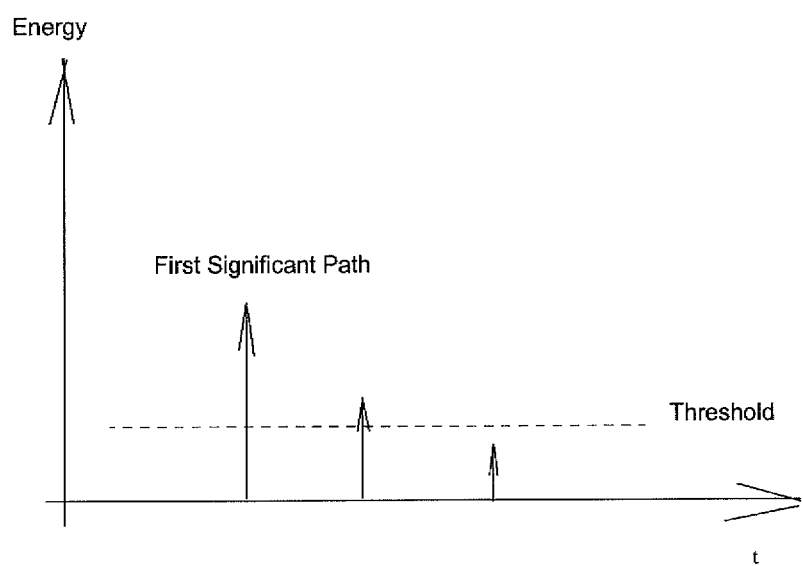
FIG. 2 illustrates the paths detection of a same signal.
Figure 3:
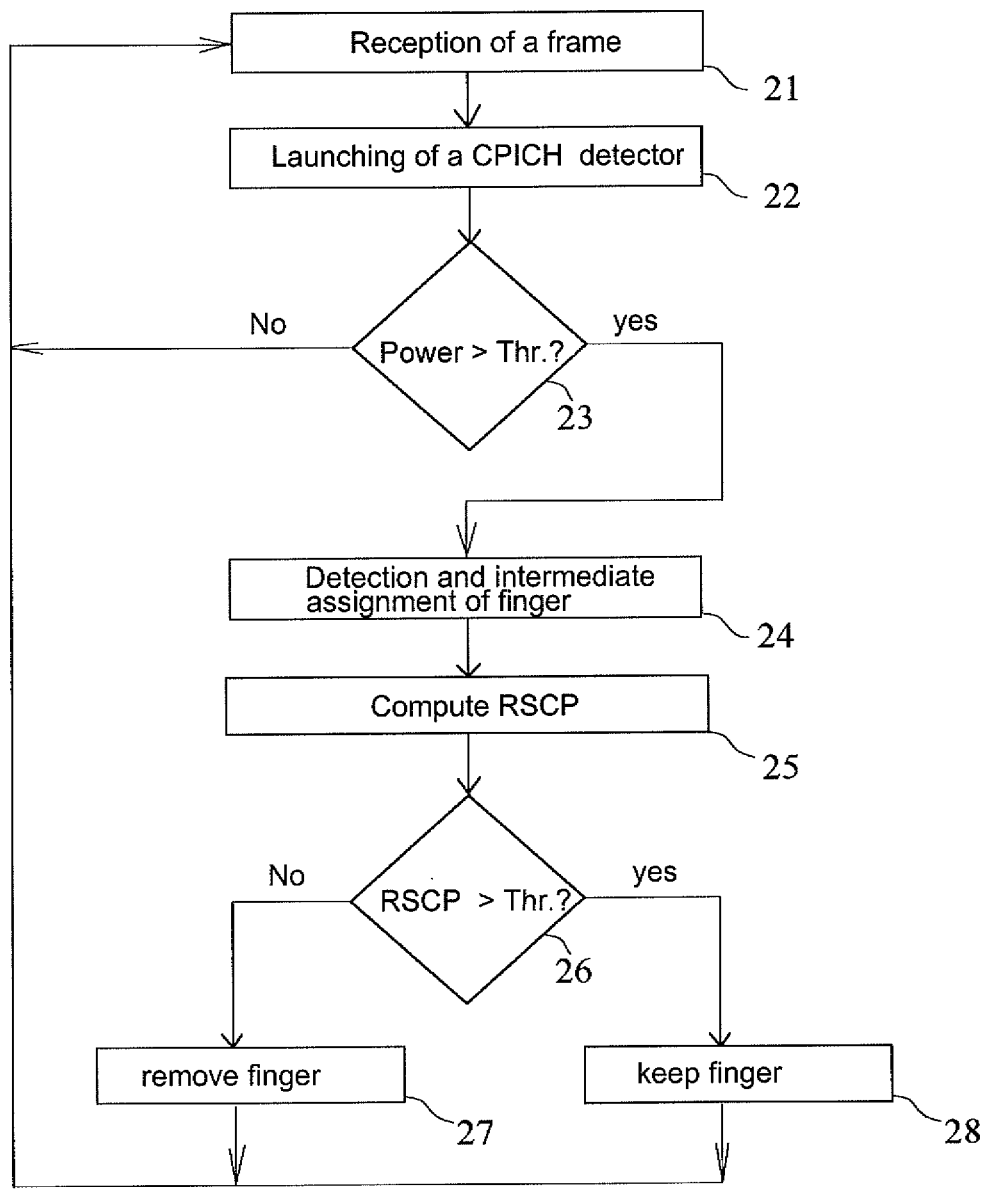
FIG. 3 illustrates an embodiment of an assignment and deallocation process of a RAKE receiver.
Figure 4:
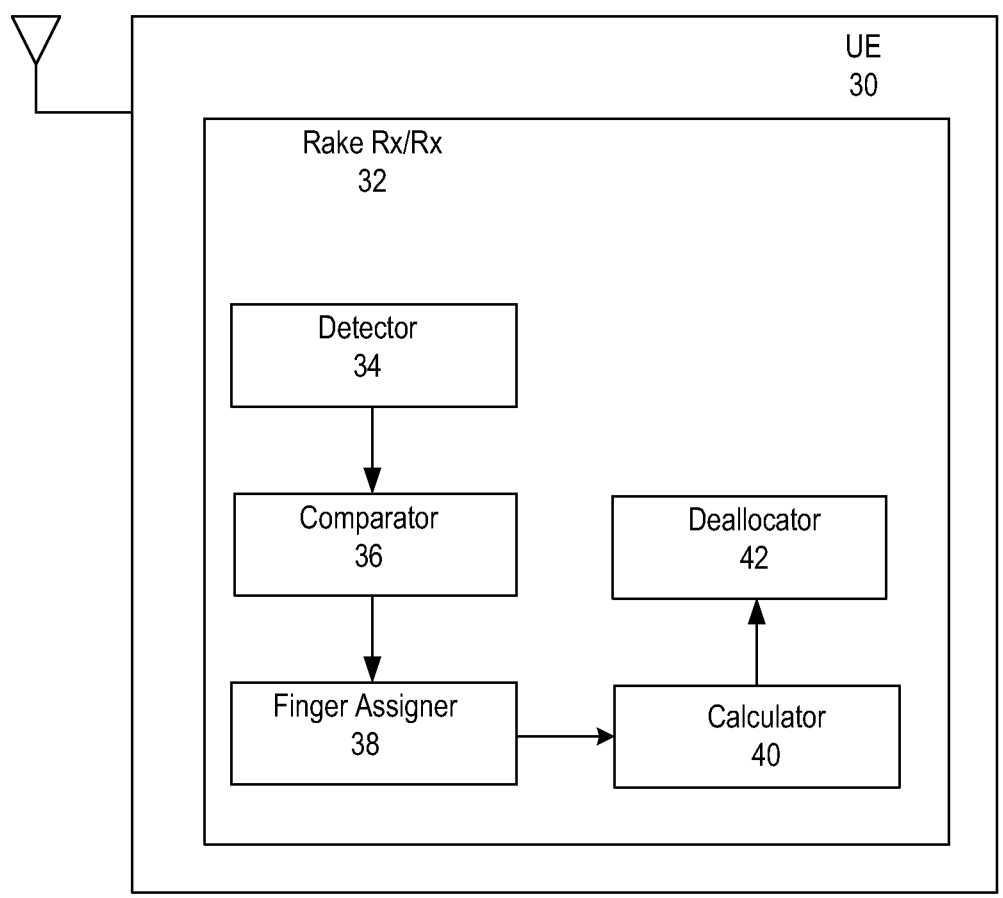
FIG. 4 illustrates an embodiment of exemplary user equipment.

A process of assignment of a finger of a rake receiver to a given reflection path is described in the case of a mobile phone or a user equipment for a 3GPP network for example. Clearly, the process described hereafter applies to a mobile phone but could also be applied to any mobile device comprising wireless communication functionalities, such as in particular a Portable Document Assistant (PDA) etc. . . . . The invention can be produced by means of digital circuits or/and using microprocessors controlled by programs or microprograms. The device can further comprise means of input/output like a display screen, a keyboard, a microphone and an audio exit or ear-phones.

In addition, the mobile phone comprises hardware and software means allowing to implement a rake receiver comprising a certain number of correlation units (or Finger), for example 6 or 8, allowing the individual treatment of a particular path.

The device or mobile phone further comprises a path detector allowing to identify a plurality of paths emanating from the base station on the basis of detection of reflections shifted against a pilot signal. Such a path detector is well-known to a person skilled in the art and will not be further described. It suffices to recall that this detector comprises means permitting the correlation of the flow of data entering with one expected pilot. The path detector measures the energy level and the temporal shift of a plurality of signals received from the base station.

The device or mobile phone finally comprises means allowing to assign the correlators (Finger) of the rake receiver to different paths identified by the paths detector according to the mechanism described hereafter.

According to the invention, a new assignment of a correlator of the RAKE receiver is immediate from the detection of a propagation path by the CPICH detector having treated a whole frame.

This immediate assignment, from the reception and the treatment of a particular frame, permits to ensure an important reactivity of the receiver to constant changes of the channel and of the propagation paths.

Clearly, this immediate assignment presents the significant drawback of increasing the amount of false detections.

Until now, this disadvantage was taken as prohibitive in the known technique and called for the recourse to the successive measurements taken on several frames and, consequently, the low reactivity of the receiver.

The inventors discovered that it was possible not to resort to successive measurements on several frames in order to associate an additional mechanism ensuring an extremely fast deallocation of a correlator that would have been affected after a wrong detection.

According to the invention, the deallocation of a RAKE receiver resource, is based to the measure of said RSCP (Received Signal Code Power) indicator calculated on the pilot channel (Master Rake), which has the effect of being used within the receiver for the measurement of the quality of a cell and to allow the controlling of the commutation process (softhandover or handover) between two neighboring cells.

More particularly, the reader will refer to the 3GPP specification TS25.215-570 reference particularly defining this RSCP indicator, measuring the value of the power received on the primary channel code CPICH ("Common Pilot Channel" CPICH). This indicator is well-known to a person skilled in the art and will not be further elaborated on. It suffices to recall that the point of reference for the RSCP indicator is the antenna connector of UE (User Equipment) receiver. In the case of a transmission diversity, one adds the value of the indicator corresponding to each transmitting antenna, separately measured, for calculating the total value of the RSCP indicator related to the channel of the CPICH pilot.

As it is known to a man skilled in the art, this RSCP indicator is used for calculating a CPICHEc/Io indicator (also defined in the above reference), which serves for monitoring the existing cells and, when appropriate, for the handover between two cells.

Now, an embodiment of a process of assignment and deallocation of the correlation units (Finger) of a RAKE receiver is described in conformity with the present invention. For the implementation of this process, one will be clearly able to resort to hardware circuits and/or software programs and microprograms.

In a step 21, the process comprises the reception of a frame.

In a step 22, the process proceeds with the launching of the CPICH detector on the received frame and, following known techniques, the detection of a pilot of ("Common Pilot Channel" (CPICH)) type and the measurement of a first indicator, such as, for example, the power of the signal or the signal to noise ratio.

Then, in a step 23, the process carries out a test for comparing the first indicator, for example a power indicator, compared to a predefined threshold.

If the first indicator seems to be lower than the predefined threshold, then the process returns to the step 21 for the treatment of the next frame.

If the first indicator seems superior to the predefined threshold, then the process continues with a step 24 which consists of an immediate assignment, without delay, of a correlation unit (Finger) to the propagation path being detected.

As it was previously mentioned, this assignment is immediate and does not require the secondary treatment of a new frame. This results to the launching of the implemented processes in the "Data" part of the RAKE receiver with, in particular, the calculation of the RSCP indicator, 15 times per frame.

In a particular and optional embodiment, one averages the RSCP indicator value on a n number of slots composing the frame, in order to calculate and derive a second indicator used to control the deallocation of the beforehand affected correlator to the propagation path.

Thus, one can increase the robustness of the deallocation device of the RAKE receiver.

More simply, if a particularly fast deallocation is desired, one will be able to simply use the first RSCP value (which will be recalled that corresponds to a filtered measurement and thus already particularly reliable) for generating the 2nd indicator being used in the finger deallocation of the RAKE receiver.

In a step 26, the process proceeds to the comparison of the calculated value of the RSCP indicator—or of its average in the case of an integration on several slots—compared to a second threshold.

If the value of the RSCP indicator seems to be lower than the threshold, the process proceeds to the deallocation of the correlator (Finger) of the RAKE receiver in a step 27 in order to be able to reallocate later on, from the next frame, this correlator to a new propagation path which would be later detected.

In the contrary case, if the value of the RSCP indicator—or its value averaged on several slots—seems like being superior to the second threshold, then the process proceeds to a step 28 where it concludes to the validation of the assignment of the previously carried out correlator and maintains this assignment active.

After steps 27 and 28, the process returns to stage 21 for processing the next frame.

As it is seen, the process is particularly simple to implement since it is based on the use of an indicator already present within the receiver, knowing the RSCP indicator usually used to the handover decision process . . . .

One observes considerable advantages of the process, applied in the context of the assignment and the deallocation of the resources of the RAKE receiver.

Indeed, initially, this indicator has the advantage of being calculated for each slot, a 10 ms frame comprising for example 15 slots.

It results that an extremely fast indicator of measurement is provided, (since intervening fifteen times per frame) likely to find a mechanism of deallocation of the resources of a detector, that this release is justified by the false detection of a propagation path or by the fading of a propagation path in an unceasingly fluctuating environment.

One even notes that it is possible to envisage to insert an integration mechanism of these RSCP measurements since one disposes 15 values per frame and that, consequently, it is possible to integrate the results of these values in order to increase the precision and the reliability of the process of deallocation of resources. And it is noted, and this is a decisive advantage of the present invention, that this integration introduced on the level of the slots does not appreciably increase the reactivity (on the level of the frame) of the process of deallocation of the correlators.

Secondly, and this is another particularly important advantage, it is observed that the mechanism of deallocation of the RAKE receiver enjoys de facto the effective filtering which offers the RSCP indicator compared to the noise.

Thirdly, it is noted that the RSCP indicator provides to the level of each finger of the rake receiver a precise and effective value of measurement, which permits to consider a treatment individualized for each correlator used within the Rake receiver.

It thus results an effective, precise and particularly simple to implement process of assignment and deallocation of correlators (finger) of the RAKE receiver.

The invention claimed is:

1. A method of assignment and deallocation of a correlation unit, or finger, of a rake receiver to process a received signal of a wireless communication system, comprising:
   assigning a rake finger in response to a Common Pilot Channel (CPICH) detector operating on a level of a frame of the signal, said assignment being performed in one frame; and
   deallocating the same finger within the same frame as said assignment in response to an analysis of a criterion derived from a Received Signal Code Power (RSCP) indicator calculated on a level of a slot of the signal;
   wherein the RSCP indicator is calculated as an integration of n successive values of the RSCP within the same frame as said assignment, and wherein the deallocating of the same finger that is performed in the same frame as said assignment in response to an analysis of a criterion derived from a RSCP comprises deallocating the same finger if the RSCP indicator is lower than a predefined threshold.

2. The method of claim 1 wherein the CPICH detector is operative to detect a propagation path based on a power detection on the CPICH channel.

3. The method of claim 1 wherein deallocating the same finger in response to an analysis of a criterion derived from a RSCP comprises deallocating the same finger in response to an analysis of a criterion derived from first RSCP value.

4. The method of claim 1, further comprising:
   receiving a data frame of a signal;
   launching a CPICH detector to detect a propagation path of the signal based on a first indicator; and
   detecting a propagation path on the basis of the first indicator; and wherein assigning a rake finger in response to a CPICH detector operating on the level of a frame of the signal comprises assigning a finger of the receiver in response to the detection of a propagation path on the data frame; and further comprising calculating the RSCP; and wherein deallocating the same finger in response to an analysis of a criterion derived from a RSCP indicator calculated on the level of a slot of the signal comprises deallocating the finger of the receiver if the RSCP is lower than a predefined threshold; and maintaining the assignment of the finger of the receiver if the RSCP is higher than a predefined threshold.

5. The method of claim 4 wherein deallocating the finger of the receiver if the RSCP is lower than a predefined threshold comprises deallocating the finger of the receiver if the RSCP is lower than a predefined threshold after an integration of n successive values of said RSCP within one same frame.

6. A rake receiver operative in a wireless communication device, comprising:
   an assignment unit operative to assign a correlation unit, or finger, in response to detecting, in a single frame, a propagation path, said assignment being performed in one frame; and
   a deallocation unit operative to deallocate the same correlation unit, or finger, within the same frame as said assignment in response to an analysis of a criterion derived from a Received Signal Code Power (RSCP) indicator calculated on the level of a slot, wherein the RSCP indicator is calculated as an integration of n successive values of the RSCP within the single frame, and wherein the deallocating of the same finger that is performed in the same frame as said assignment in response to an analysis of a criterion derived from a RSCP comprises deallocating the same finger if the RSCP indicator is lower than a predefined threshold.

7. The receiver of claim 6 wherein detecting a propagation path is based on the power detection on the Common Pilot Channel (CPICH).

8. A User Equipment operative in a wireless communication network, comprising:
   a rake receiver;
   a receiver operative to receive a frame;
   a detector operative to detect a pilot
   a comparator operative to compare the pilot energy to a first threshold value;
   a finger assigner operative to assign a finger of the rake receiver in response to a detection of a propagation path in the frame, said assignment being performed in one frame;
   a calculator operative to calculate a Received Signal Code Power (RSCP); and
   a deallocator operative to deallocate a finger of the rake receiver within the same frame as said assignment in response to a comparison between a computed value of the RSCP and a second threshold value, wherein the computed value of the RSCP is an integration of n successive values of the RSCP within the same frame, and wherein the deallocating of the finger that is performed in the same frame as said assignment in response to a comparison between a computed value of the RSCP and a second threshold value comprises deallocating the same finger if the computed value of the RSCP is lower than the second threshold.

* * * * *